United States Patent
Zhao et al.

(10) Patent No.: US 10,302,788 B2
(45) Date of Patent: May 28, 2019

(54) METHOD AND APPARATUS FOR IDENTIFYING COLLAPSED COAL COLUMN

(71) Applicant: CHINA UNIVERSITY OF MINING & TECHNOLOGY, BEIJING, Beijing (CN)

(72) Inventors: Jingtao Zhao, Beijing (CN); Suping Peng, Beijing (CN); Wenfeng Du, Beijing (CN); Xiaoting Li, Beijing (CN)

(73) Assignee: CHINA UNIVERSITY OF MINING & TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 15/758,559

(22) PCT Filed: Dec. 29, 2016

(86) PCT No.: PCT/CN2016/113064
§ 371 (c)(1),
(2) Date: Mar. 8, 2018

(87) PCT Pub. No.: WO2017/133361
PCT Pub. Date: Aug. 10, 2017

(65) Prior Publication Data
US 2018/0246241 A1    Aug. 30, 2018

(30) Foreign Application Priority Data

Feb. 2, 2016 (CN) .......................... 2016 1 0073638

(51) Int. Cl.
*G01V 1/36* (2006.01)
*G01V 1/30* (2006.01)

(52) U.S. Cl.
CPC .............. *G01V 1/307* (2013.01); *G01V 1/301* (2013.01); *G01V 1/362* (2013.01); *G01V 1/303* (2013.01);
(Continued)

(58) Field of Classification Search
CPC ......... G01V 1/307; G01V 1/303; G01V 1/362
See application file for complete search history.

(56) References Cited

U.S. PATENT DOCUMENTS

2004/0081343 A1* 4/2004 Takeo .................. G06T 7/0012
382/131
2009/0037153 A1* 2/2009 Grichnik ............. G06F 17/5009
703/2

(Continued)

FOREIGN PATENT DOCUMENTS

CN     102841063 A  * 12/2012
CN     103076631     5/2013
(Continued)

OTHER PUBLICATIONS

Hu et al. Numerical simulation scattered imaging in deep mines, Applied Geophysic, pp. 271-282.*

(Continued)

*Primary Examiner* — Mohamed Charioui
*Assistant Examiner* — Eyob Hagos
(74) *Attorney, Agent, or Firm* — Price Heneveld LLP

(57) ABSTRACT

A coal collapse column identification method and related apparatus that includes acquiring seismic shot gather data in a target region and a seismic wave migration velocity file; calculating a diffraction wave travel time of each piece of single-shot data at different imaging points according to the data; performing Mahalanobis distance calculation processing on each single-shot data and the diffraction wave travel time thereof to acquire a diffraction wave amplitude value (Continued)

sample point of each piece of single-shot data; imaging respectively on a diffraction wave of each piece of single-shot data; and superposing imaging processing results of all the single-shot data corresponding to the seismic shot gather data to obtain a diffraction wave imaging result of the seismic shot gather data so as to facilitate coal collapse column identification according to the diffraction wave imaging result. A diffraction wave corresponding to seismic shot gather data is extracted through a Mahalanobis distance.

4 Claims, 5 Drawing Sheets

(52) U.S. Cl.
CPC .. *G01V 2210/51* (2013.01); *G01V 2210/6222* (2013.01); *G01V 2210/641* (2013.01); *G01V 2210/642* (2013.01); *G01V 2210/646* (2013.01)

(56) References Cited

U.S. PATENT DOCUMENTS

2010/0131205 A1    5/2010  Berkovitch et al.
2010/0268471 A1*  10/2010  Kiyashchenko ......... G01V 1/30
                                                        702/16

FOREIGN PATENT DOCUMENTS

| CN | 103984012 | | 8/2014 |
| CN | 104237940 | | 12/2014 |
| CN | 104237940 | A  * | 12/2014 |
| CN | 104730571 | | 6/2015 |
| CN | 105607121 | | 5/2016 |

OTHER PUBLICATIONS

Elfadaly et al., "On point estimation of the abnormality of a Mahalanobis index", ScienceDirect, pp. 115-130.*

State Intellectual Property Office of the P.R. China; International Search Report; dated Mar. 6, 2017.

Yang, Deyi et al., "Diffraction waves from fallen pillars", Geophy Sical Prospecting for Petroleum, vol. 39, No. 4, Dec. 25, 2000 (Dec. 25, 2000), ISSN: 1000-1441, pp. 82-86.

Zhou, Guoxing et al., "Modelling research on characteristics and extraction method of abnormal seismic waves on small scale karst collapse column", Coal Geology & Exploration, vol. 34, No. 5, Oct. 22, 2006 (Oct. 22, 2006), ISSN: 1001-1986, pp. 63-65.

Yang, Deyi et al., "The application of special seismic section in the subsiding column searching", Coal Geology & Exploration, vol. 30, No. 6, Dec. 22, 2002 (Dec. 22, 2002), ISSN: 1001-1986, pp. 47-49.

* cited by examiner

METHOD AND APPARATUS FOR IDENTIFYING COLLAPSED COAL COLUMN

CROSS-REFERENCE TO RELATED APPLICATIONS

The present application claims the priority to the Chinese patent application with the filing No. CN201610073638.7, filed with the State Intellectual Property Office on Feb. 2, 2016, entitled "Method and Apparatus for Identifying Collapsed coal column", contents of which are incorporated herein by reference in its entirety.

TECHNICAL FIELD

The present disclosure relates to the field of seismic data imaging, and particularly to a method and apparatus for identifying a collapsed coal column based on seismic diffracted wave imaging.

BACKGROUND ART

During the process of coal mining, discontinuous geological bodies, such as faults, fractures and collapsed columns, would destroy the continuity of coal seams, which is prone to inducing accidents such as water inrush and gas burst, and poses serious threats to the safety of coal mining operation. Therefore, it is of great significance to effectively identify the discontinuous geological bodies such as faults, fractures and collapsed columns.

At present, there are a lot of methods for identifying faults and fractures, including a seismic coherence technique (Bahorich and Farmer, 1995; Marfurt, et al., 1998, 1999; Gersztenkorn and Marfurt, 1999), a matching pursuit algorithm (Mallat and Zhang, 1993; Castagna et al., 2003; Liu and Marfurt, 2005), a spectral decomposition algorithm (Partyka et al., 1999; Puryear et al., 2012; Gao et al., 2013) and so on. However, due to characteristics, such as different sizes and irregular distribution, of the collapsed columns themselves, none of the above several methods could effectively identify the collapsed column. Therefore, identification of the collapsed column has always been a difficulty in seismic exploration.

In order to solve the above difficulty, a seismic wave imaging technique is adopted in the related art to identify the collapsed column, which specifically includes: collecting seismic shot gather data, imaging reflected waves in the seismic shot gather data with an existing seismic wave imaging technique, and identifying a collapsed coal column based on a result of the imaging performed on the reflected waves. However, the reflected wave is a macro-scale geological element response, and usually can only solve a problem of exploring a geological body with a spatial distribution greater than one seismic wavelength, but it does not well identify small-scale geological information, such as the collapsed coal column. Therefore, the seismic wave imaging technique developed for reflected waves is ineffective in imaging small-scale geological information such as the collapsed column, and thus cannot well identify the small-scale geological information such as the collapsed coal column.

SUMMARY OF THE INVENTION

An object of the present disclosure is to provide a method and apparatus for identifying a collapsed coal column, which can extract diffracted waves carrying small-scale geological information in acquired seismic shot gather data, and accurately evaluate a geological body of collapsed column with the imaged diffracted waves, thereby accurately identifying a collapsed coal column in a target area.

In a first aspect, an embodiment of the present disclosure provides a method for identifying a collapsed coal column, which includes:

acquiring seismic shot gather data of a target area and seismic wave migration velocity files corresponding to the seismic shot gather data, where the seismic shot gather data comprises a plurality of pieces of single-shot data, each piece of the single-shot data comprises a plurality of seismic waves reflected or refracted by underground rock interfaces, and the seismic waves carry geological information;

calculating diffracted wave travel times for each piece of the single-shot data from a seismic wave shot point position of the each piece of the single-shot data through any imaging point position in an underground imaging space to a seismic wave geophone point position of the each piece of the single-shot data, according to geophone spatial positions and the seismic wave migration velocity file corresponding to the each piece of the single-shot data;

performing Mahalanobis distance calculation processing on each piece of the single-shot data and the diffracted wave travel time of the each piece of the single-shot data, to obtain diffracted wave amplitude sampling points of the each piece of the single-shot data, where the diffracted wave amplitude sampling points carry small-scale geological information, with the small-scale geological information at least comprising stratigraphic position information, fault information and collapsed column information;

imaging respectively the diffracted wave amplitude sampling points of each piece of the single-shot data, to obtain a diffracted wave imaging result of the each piece of the single-shot data; and superposing the diffracted wave imaging results of all the single-shot data corresponding to the seismic shot gather data, to obtain a diffracted wave imaging result of the seismic shot gather data, so as to identify the collapsed coal column according to the diffracted wave imaging result of the seismic shot gather data.

In combination with the first aspect, an embodiment of the present disclosure provides a first possible implementation of the first aspect, specifically, the step of calculating diffracted wave travel times for each piece of the single-shot data from a seismic wave shot point position of the each piece of the single-shot data through any imaging point position in an underground imaging space to a seismic wave geophone point position of the each piece of the single-shot data, according to geophone spatial positions and the seismic wave migration velocity file corresponding to the each piece of the single-shot data, includes:

calculating travel times $t_S$ from a seismic wave shot point position of each piece of the single-shot data to individual imaging point positions in an underground imaging space, according to geophone spatial positions and the seismic wave migration velocity file corresponding to the each piece of the single-shot data;

calculating travel times $t_R$ from the individual imaging point positions in the underground imaging space to a seismic wave geophone point position of each piece of the single-shot data, according to the geophone spatial positions and the seismic wave migration velocity file corresponding to the each piece of the single-shot data, where the travel time $t_R$ and the travel time $t_S$ of each piece of the single-shot data at one imaging point correspond to each other; and adding each of the travel times $t_S$ and the travel time $t_R$ corresponding to the travel time $t_S$ for each piece of the single-shot data, to obtain a plurality of diffracted wave travel times corresponding to the each piece of the single-shot data.

In combination with the first possible implementation of the first aspect, an embodiment of the present disclosure provides a second possible implementation of the first aspect, specifically, the step of performing Mahalanobis distance calculation processing on each piece of the single-shot data and the diffracted wave travel time of the each piece of the single-shot data, to obtain diffracted wave amplitude sampling points of the each piece of the single-shot data, includes:

calculating, as for any one piece of the single-shot data, according to the one piece of single-shot data and the plurality of diffracted wave travel times of the one piece of single-shot data, an amplitude sampling point sequence of each imaging point in the underground imaging space corresponding to the one piece of single-shot data, to obtain a plurality of amplitude sampling point sequences corresponding to the one piece of single-shot data;

ranking amplitude sampling points in each of the obtained amplitude sampling point sequences, according to energy of the amplitude sampling points;

performing Mahalanobis distance calculation processing on each of the ranked amplitude sampling point sequences, to obtain Mahalanobis distances of all the amplitude sampling points ranked in a preset order in the each of the amplitude sampling point sequences; and extracting amplitude sampling points satisfying a preset condition from each of the amplitude sampling point sequences according to the Mahalanobis distances of all the amplitude sampling points ranked in the preset order in the corresponding amplitude sampling point sequence, to obtain a plurality of sets of diffracted wave amplitude sampling points corresponding to each piece of the single-shot data.

In combination with the second possible implementation of the first aspect, an embodiment of the present disclosure provides a third possible implementation of the first aspect, specifically, the step of performing Mahalanobis distance calculation processing on each of the ranked amplitude sampling point sequences to obtain Mahalanobis distances of all the amplitude sampling points ranked in a preset order in the each of the amplitude sampling point sequences, includes:

calculating a median value for each of the amplitude sampling point sequences ranked in a preset order through a formula $\mu_x = \text{median}\{x_{(1)}^o, x_{(2)}^o, L, x_{(N)}^o\}$ where $\mu_x$ represents a median value of the amplitude sampling point sequence, median represents a median value operation, $x_{(i)}^o, i=1,2,L,N$ represents the amplitude sampling point sequences ranked in the preset order, and N represents the number of the sampling points in the amplitude sampling point sequence;

calculating a square of an median value of absolute value of deviation, for each of the amplitude sampling point sequences ranked in the preset order, through a formula $$\sigma_x^2 = \left(\underset{i=1,2,L,N}{\text{median}}\{|x_{(i)}^o - \mu_x|\}\right)^2,$$

where $\sigma_x^2$ represents the square of the median value of absolute value of deviation; and calculating Mahalanobis distances of all the amplitude sampling points ranked in the preset order in each of the amplitude value sample point sequences, $$d(x_{(i)}^o, \mu_x) = \frac{[x_{(i)}^o - \mu_x]^2}{\sigma_x^2},$$

according to the median value and the square of the median value of absolute value of deviation, where $d(x_{(i)}^o, \mu_x)$ represents the Mahalanobis distance.

In combination with the third possible implementation of the first aspect, an embodiment of the present disclosure provides a fourth possible implementation of the first aspect, specifically, the step of extracting amplitude sampling points satisfying a preset condition from each of the amplitude sampling point sequences according to the Mahalanobis distances of all the amplitude sampling points ranked in the preset order in the corresponding amplitude sampling point sequence, includes:

calculating, as for any one of the amplitude sampling point sequences, the number of the sample points to be removed from the amplitude sampling point sequence, according to the Mahalanobis distance of each of the amplitude sampling points ranked in the preset order in the amplitude sampling point sequence and a preset Mahalanobis distance threshold of a reflected wave amplitude sampling point;

performing sampling point removing processing on the amplitude sampling points ranked in the preset order in the amplitude sampling sequence according to the preset Mahalanobis distance threshold and the number of the sample points to be removed, to obtain remaining amplitude sampling points in the amplitude sampling point sequence; and extracting the remaining amplitude sampling points as amplitude sampling points satisfying a preset condition in the amplitude sampling point sequence.

In combination with the fourth possible implementation of the first aspect, an embodiment of the present disclosure provides a fifth possible implementation of the first aspect, specifically, the step of imaging respectively the diffracted wave amplitude sampling points of each piece of the single-shot data to obtain a diffracted wave imaging result of the each piece of the single-shot data, includes:

adding the amplitude value sampling points satisfying the preset condition that are extracted from each of the amplitude sampling point sequences, to obtain a diffracted wave imaging result corresponding to the each of the amplitude sampling point sequences; and superposing the diffracted wave imaging results of all the amplitude sampling point sequences corresponding to the single-shot data, to obtain a diffracted wave imaging result corresponding to the single-shot data.

In combination with the fifth possible implementation of the first aspect, an embodiment of the present disclosure provides a sixth possible implementation of the first aspect, specifically, the step of adding the amplitude value sampling points satisfying the preset condition that are extracted from each of the amplitude sampling point sequences to obtain a diffracted wave imaging result corresponding to the each of the amplitude sampling point sequences, includes:

adding the amplitude sampling points satisfying the preset condition that are extracted from each of the amplitude sampling point sequences through a formula $$V(m) = \frac{-1}{2\pi} \int \int_A Tri_M\{w(m, r)u(r, t_S + t_R)\}dr,$$

to obtain a diffracted wave imaging result corresponding to the each of the amplitude sampling point sequences, where V(m) represents the diffracted wave imaging result, m=m (x,y,z) represents each imaging point position in the underground imaging space, u(r,t$_S$+t$_R$) represents pre-processed seismic shot gather data, r(x,y,z) represents a geophone point position, t$_S$ and t$_R$ represent the travel time from a shot point position to the imaging point position and the travel time from the imaging point position to the geophone position, respectively, A represents a migration imaging pore diameter, w(m,r) represents a geometric spreading factor, and Tri$_M$ represents a diffracted wave imaging operator for the removal based on the Mahalanobis distance and a reflected wave amplitude.

In combination with the first aspect, an embodiment of the present disclosure provides a seventh possible implementation of the first aspect, specifically, the step of acquiring seismic shot gather data of a target area and seismic wave migration velocity files corresponding to the seismic shot gather data, includes:

acquiring seismic shot gather data of a target area;

performing seismic pre-processing on the seismic shot gather data to obtain seismic shot gather data usable for migration imaging, where the seismic pre-processing at least comprises denoising processing and statics correction processing; and performing migration velocity analysis processing on the seismic shot gather data, to obtain seismic wave migration velocity files corresponding to the seismic shot gather data.

In a second aspect, an embodiment of the present disclosure further provides an apparatus for identifying a collapsed coal column, where the apparatus includes:

an acquiring module, configured to acquire seismic shot gather data of a target area and seismic wave migration velocity files corresponding to the seismic shot gather data, where the seismic shot gather data comprise a plurality of pieces of single-shot data, each piece of the single-shot data comprises a plurality of seismic waves reflected or refracted by underground rock interfaces, and the seismic waves carry geological information;

a diffracted wave travel time calculating module, configured to calculate, according to geophone spatial positions and the seismic wave migration velocity file corresponding to each piece of the single-shot data, diffracted wave travel times for the each piece of the single-shot data from a seismic wave shot point position of the each piece of the single-shot data through any imaging point position in an underground imaging space to a seismic wave geophone point position of the each piece of the single-shot data;

a Mahalanobis distance calculation processing module, configured to perform Mahalanobis distance calculation processing on each piece of the single-shot data and the diffracted wave travel time of the each piece of the single-shot data, to obtain diffracted wave amplitude sampling points of the each piece of the single-shot data, where the diffracted wave amplitude sampling points carry small-scale geological information, with the small-scale geological information at least comprising stratigraphic position information, fault information and collapsed column information;

an imaging module, configured to image respectively the diffracted wave amplitude sampling points of each piece of the single-shot data, to obtain a diffracted wave imaging result of the each piece of the single-shot data; and a superposing module, configured to superpose the diffracted wave imaging results of all the single-shot data corresponding to the seismic shot gather data, to obtain a diffracted wave imaging result of the seismic shot gather data, so as to identify the collapsed coal column according to the diffracted wave imaging result of the seismic shot gather data.

In combination with the second aspect, an embodiment of the present disclosure provides a first possible implementation of the second aspect, specifically, the diffracted wave travel time calculating module includes:

a first travel time calculating unit, configured to calculate, according to geophone spatial positions and the seismic wave migration velocity file corresponding to each piece of the single-shot data, travel times t$_S$ from the seismic wave shot point position of the each piece of the single-shot data to individual imaging point positions in the underground imaging space;

a second travel time calculating unit, configured to calculate, according to the geophone spatial positions and the seismic wave migration velocity file corresponding to each piece of the single-shot data, travel times t$_R$ from the individual imaging point positions in the underground imaging space to the seismic wave geophone point position of the each piece of the single-shot data, where the travel time t$_R$ and the travel time t$_S$ of each piece of the single-shot data at one imaging point correspond to each other; and a first summing unit, configured to add each of the travel times t$_S$ and the travel time t$_R$ corresponding to the travel time t$_S$ for each piece of the single-shot data, to obtain a plurality of diffracted wave travel times corresponding to the each piece of the single-shot data.

The embodiments of the present disclosure provide a method and apparatus for identifying a collapsed coal column, in which the following steps are included: acquiring seismic shot gather data of a target area and seismic wave migration velocity files; calculating diffracted wave travel times of each piece of the single-shot data at different imaging points, according to geophone spatial positions and the seismic wave migration velocity file corresponding to the each piece of the single-shot data; performing Mahalanobis distance calculation processing on each piece of the single-shot data and the diffracted wave travel time of the each piece of the single-shot data, to obtain diffracted waves of the each piece of the single-shot data; imaging respectively the diffracted waves of the each piece of the single-shot data, to obtain a diffracted wave imaging result of the each piece of the single-shot data; superposing the diffracted wave imaging results of all the single-shot data corresponding to the seismic shot gather data to obtain a diffracted wave imaging result of the seismic shot gather data, and identifying the collapsed coal column according to the diffracted wave imaging result of the seismic shot gather data.

Compared with the seismic wave imaging technique developed for reflected waves in the prior art which has poor performance in identifying collapsed columns, in the present disclosure, the diffracted wave travel times corresponding to each piece of the single-shot data in the seismic shot gather data are firstly calculated; Mahalanobis distance calculation processing is performed on the single-shot data and the diffracted wave travel times of the single-shot data, so as to obtain the diffracted waves corresponding to all the single-shot data; and then the diffracted waves are imaged. Since the diffracted waves carry small-scale geological information, the geological body of the collapsed column can be accurately evaluated with the imaged diffracted waves, that is, the collapsed coal column in a target area can be accurately identified. Therefore, the risk of accidents, such as water burst and gas leakage, caused by the collapsed column can be reduced during coal exploitation, and unnecessary casualty and economic loss are accordingly decreased.

In order to make it more obvious and easier to understand the above objects, features and advantages of the present disclosure, preferable embodiments are particularly illustrated below for detailed description in conjunction with the drawings.

BRIEF DESCRIPTION OF DRAWINGS

In order to more clearly illustrate technical solutions of embodiments of the present disclosure, figures which are needed for description of the embodiments will be introduced briefly below. It should be understood that the figures below merely show some embodiments of the present disclosure, and therefore should not be considered as limiting the scope. For a person ordinarily skilled in the art, other relevant figures can also be obtained in light of these figures, without paying inventive effort.

DETAILED DESCRIPTION OF EMBODIMENTS

Figure 1:
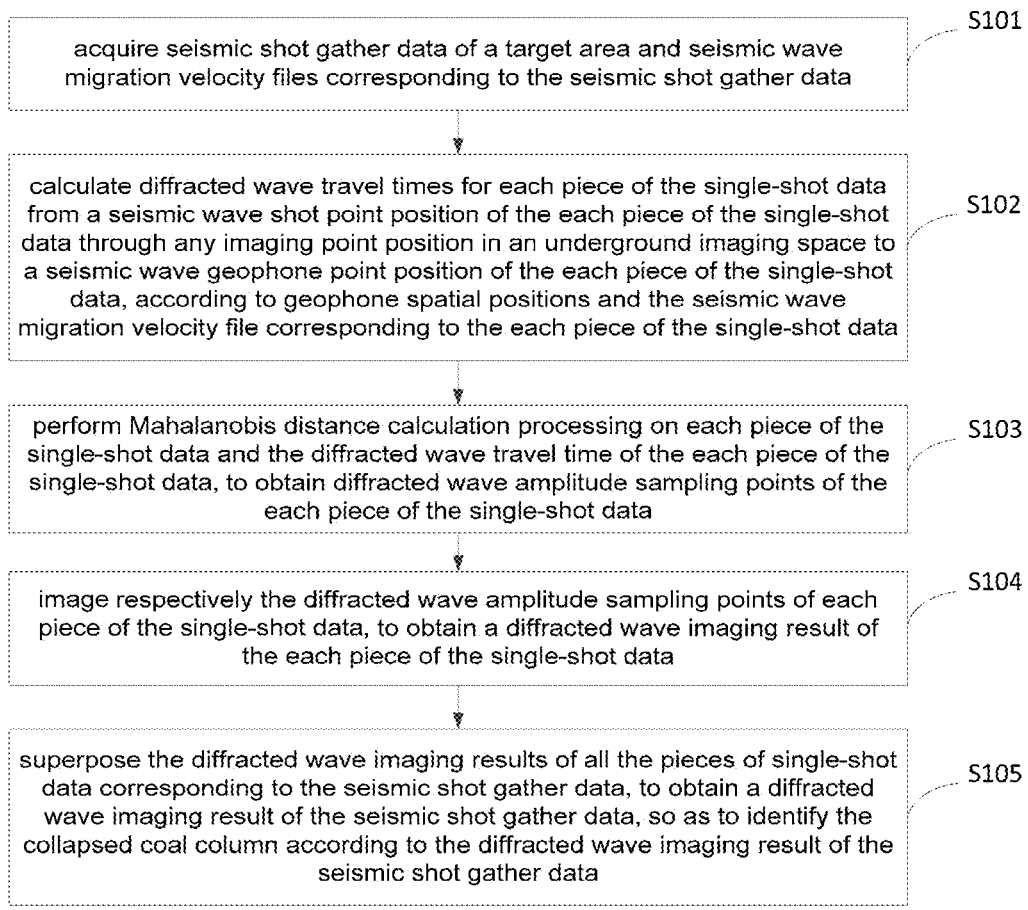
FIG. 1 shows a flow chart of a method for identifying a collapsed coal column provided by embodiments of the present disclosure.

Below technical solutions of embodiments of the present disclosure will be described clearly and completely in conjunction with figures of the embodiments of the present disclosure. Apparently, some but not all of embodiments of the present disclosure are described. Generally, components in the embodiments of the present disclosure, as described and shown in the figures herein, can be arranged and designed in different configurations. Therefore, the detailed description below of the embodiments of the present disclosure, that is provided in the figures, is not intended to limit the scope of protection of the present disclosure, but merely represents chosen embodiments of the present disclosure. Based on the embodiments of the present disclosure, all the other embodiments which a person skilled in the art obtains without paying inventive effort would fall within the scope of protection of the present disclosure.

Currently, the method for identifying a collapsed column with a seismic wave imaging technique mainly depends on an imaging result of reflected waves, which makes it unable to well identify small-scale geological information on for example a collapsed coal column. In practice, a diffracted wave carries small-scale geological information, and therefore makes it possible to detect geological information with a spatial distribution smaller than one seismic wavelength. With the improvement of the seismic wave imaging technique and the development of the computer processing capacity, it has already been developed to directly image with diffracted waves so as to detect small-scale geological bodies, such as karst caves and cracks. As to researches on diffracted wave imaging techniques, there are mainly three types, including a diffracted wave separating and imaging method based on signals (Harlan, et al., 1984; Taner et al., 2006; Fomel et al., 2006, 2007); Bansal and Inhof, 2005), a diffracted wave imaging method based on a focusing concept (Berkovitch et al., 2009; Dell and Gajewski, 2011; Asgedom et al., 2011) and a diffracted wave imaging method with a modified Kirchhoff imaging function (Zhang, 2004; Moser and Howard, 2008; Figueiredo et al., 2013; Zhao et al., 2015).

A method and apparatus for identifying a collapsed coal column (which can also be referred to as a method and apparatus for identifying a collapsed coal column based on seismic diffracted wave imaging) provided by embodiments of the present disclosure belong to the third type of the above diffracted wave imaging techniques, which in principle realize the diffracted wave imaging through the statistical Mahalanobis distance criterion based on a difference between amplitude characteristics of a diffracted wave and a reflected wave. Since the diffracted wave carries smaller-scale geological information, the approach of evaluating the collapsed coal column by directly using the diffracted wave imaging enables a more genuine underground geological condition to be reflected, so that the collapsed coal column in a target area can be identified accurately. Moreover, it is unnecessary to remove the reflected wave in advance, and thus an efficient calculating capacity is achieved.

Referring to FIG. 1, an embodiment of the present disclosure provides a method for identifying a collapsed coal column. The method includes steps as follows.

In S101, seismic shot gather data of a target area and seismic wave migration velocity files corresponding to the seismic shot gather data are acquired, where the seismic shot gather data includes a plurality of pieces of single-shot data, each piece of the single-shot data includes a plurality of seismic waves reflected or refracted by underground rock interfaces, and the seismic waves carry geological information.

Specifically, the target area is a pre-selected area for which the identification of the collapsed coal column is to be performed. This target area includes a plurality of hypocenters and a plurality of geophones, with one hypocenter corresponding to a plurality of geophones. The plurality of hypocenters correspond to a plurality of seismic wave shot point positions, and the plurality of geophones correspond to a plurality of seismic wave geophone positions. The plurality of hypocenters may send a plurality of pieces of single-shot data, and the plurality of single-shot data constitutes the seismic shot gather data. Correspondingly, the plurality of geophones can collect the plurality of single-shot data, and the plurality of single-shot data constitutes the seismic shot gather data.

Specifically, the seismic wave migration velocity files are obtained by preforming migration velocity analysis processing on the seismic shot gather data. The seismic wave migration velocity files, corresponding to stratigraphic velocity parameters, are used to calculate a seismic wave propagation travel time (i.e., time), and they are obtained by performing migration velocity analysis on the seismic shot gather data. The migration velocity analysis belongs to a velocity modeling technique, which determines a velocity parameter by analyzing a focusing property of the seismic wave from collected seismic data, so as to obtain the seismic wave migration velocity file.

In the above, the geological information carried in the seismic wave includes not only small-scale geological information, but also large-scale geological information. The small-scale geological information includes stratigraphic position information, fault information and collapsed column information.

In S102, diffracted wave travel times for each piece of the single-shot data from a seismic wave shot point position of the each piece of the single-shot data through any imaging point position in an underground imaging space to a seismic wave geophone point position of the each piece of the single-shot data are calculated, according to geophone spatial positions and the seismic wave migration velocity file corresponding to the each piece of the single-shot data, where each piece of the single-shot data corresponds to a plurality of geophones, and each of the geophones is arranged at a corresponding geophone point position.

Specifically, the diffracted wave travel times are calculated according to the geophone spatial positions corresponding to each piece of the single-shot data and the seismic wave migration velocity files corresponding to the each piece of the single-shot data, i.e., the diffracted wave travel time is calculated according to a ray tracing eikonal equation, where the ray tracing eikonal equation expresses a differential relation among the velocity (i.e., the seismic wave migration velocity file corresponding to the single-shot data), the spatial position (i.e., the geophone spatial position corresponding to the single-shot data) and the seismic wave travel time.

Since the acquired seismic shot gather data of the target area include a plurality of pieces of single-shot data, for each piece of the single-shot data, a travel time from the seismic wave shot point position of this single-shot data to any imaging point position in the underground imaging space (which is herein referred to as a first travel time in order to be distinguished from another travel time below) is firstly calculated, according to this single-shot data and the seismic wave migration velocity file corresponding thereto; and since the underground imaging space includes therein a plurality of imaging points, a plurality of the first travel times from the seismic wave shot point position of this single-shot data to any imaging point position in the underground imaging space are calculated accordingly.

Then, a plurality of diffracted wave travel times from any imaging point position in the underground imaging space to the seismic wave geophone point position of this single-shot data (which are herein referred to as second travel times) are calculated, with one second travel time at each imaging point corresponding to one first travel time.

Finally, the first travel time and the second travel time corresponding to the first travel time are summed up, to obtain the diffracted wave travel time corresponding to one piece of the single-shot data.

For each piece of the single-shot data in the seismic shot gather data, the above calculation of the diffracted wave travel time for one piece of the single-shot data may be performed, so as to obtain the diffracted wave travel times of all the single-shot data in the seismic shot gather data.

In S103, Mahalanobis distance calculation processing is performed on each piece of the single-shot data and the diffracted wave travel time of the each piece of the single-shot data, to obtain diffracted wave amplitude sampling points of the each piece of the single-shot data, where the diffracted wave amplitude sampling points carry small-scale geological information, with the small-scale geological information at least including stratigraphic position information, fault information and collapsed column information.

Specifically, for each piece of the single-shot data, a plurality of amplitude sampling point sequences (i.e. a plurality of imaging amplitude sampling point sequences) of individual imaging points in the underground imaging space corresponding to this single-shot data can be calculated according to this single-shot data and the diffracted wave travel times of this single-shot data.

For each of the amplitude sampling point sequences, the Mahalanobis distance of each amplitude sampling point in the amplitude sampling point sequence is calculated; and finally, the amplitude sampling points corresponding to a reflected wave are removed from the amplitude sampling point sequence according to the calculated Mahalanobis distances, and the remaining amplitude sampling points are amplitude sampling points corresponding a diffracted wave in the amplitude sampling point sequence.

Specifically, one piece of the single-shot data corresponds to a plurality of amplitude sampling point sequences. Therefore, a plurality of amplitude sampling point sequences corresponding to one piece of the single-shot data may be calculated according to the above method for calculating the diffracted wave amplitude sampling points in one amplitude sampling point sequence.

According to the above method for calculating the plurality of amplitude sampling point sequences corresponding to one piece of the single-shot data, the amplitude sampling point sequences corresponding to all the single-shot data in the seismic shot gather data may be calculated.

In S104, the diffracted wave amplitude sampling points of each piece of the single-shot data are imaged, to obtain a diffracted wave imaging result of the each of single-shot data.

Specifically, for each piece of the single-shot data, the each piece of the single-shot data includes a plurality of amplitude sampling point sequences, and all diffracted wave amplitude sampling points in each of the amplitude sampling point sequences are summed up, to obtain the diffracted wave imaging result corresponding to the each of the amplitude sampling point sequences.

For each piece of the single-shot data, the diffracted wave imaging results corresponding to the individual amplitude sampling point sequences included therein are superposed, to obtain the diffracted wave imaging result corresponding to this single-shot data.

In S105, the diffracted wave imaging results of all the single-shot data corresponding to the seismic shot gather data, to obtain a diffracted wave imaging result of the seismic shot gather data are superposed, so as to identify the collapsed coal column according to the diffracted wave imaging result of the seismic shot gather data Since the acquired seismic shot gather data carry data reflecting the geological information of the target area, whereas each piece of the single-shot data in the seismic shot gather data only carries part of the data reflecting the geological information of the target area, in a practical calculating process, each piece of the single-shot data is imaged separately, and finally the imaging results of the individual single-shot data are superposed to obtain the diffracted wave imaging result of the seismic shot gather data.

The geological body of the collapsed column can be accurately evaluated by identifying the collapsed coal column according to the finally obtained diffracted wave imaging result of the seismic shot gather data, so that the collapsed coal column in the target area is identified accurately.

Compared with the seismic wave imaging technique developed for reflected waves in the prior art which has poor performance in identifying collapsed columns, in the method for identifying a collapsed coal column provided by the embodiment of the present disclosure, the diffracted wave travel times corresponding to each piece of the single-shot data in the seismic shot gather data are firstly calculated; Mahalanobis distance calculation processing is performed on the single-shot data and the diffracted wave travel times of the single-shot data, so as to obtain the diffracted waves corresponding to all the single-shot data; and then the diffracted waves are imaged. Since the diffracted waves carry small-scale geological information, the geological body of the collapsed column can be accurately evaluated with the imaged diffracted waves, that is, the collapsed coal column in a target area can be accurately identified. Therefore, the risk of accidents, such as water burst and gas leakage, caused by the collapsed column can be reduced during coal exploitation, and unnecessary casualty and economic loss are accordingly decreased.

Figure 2:
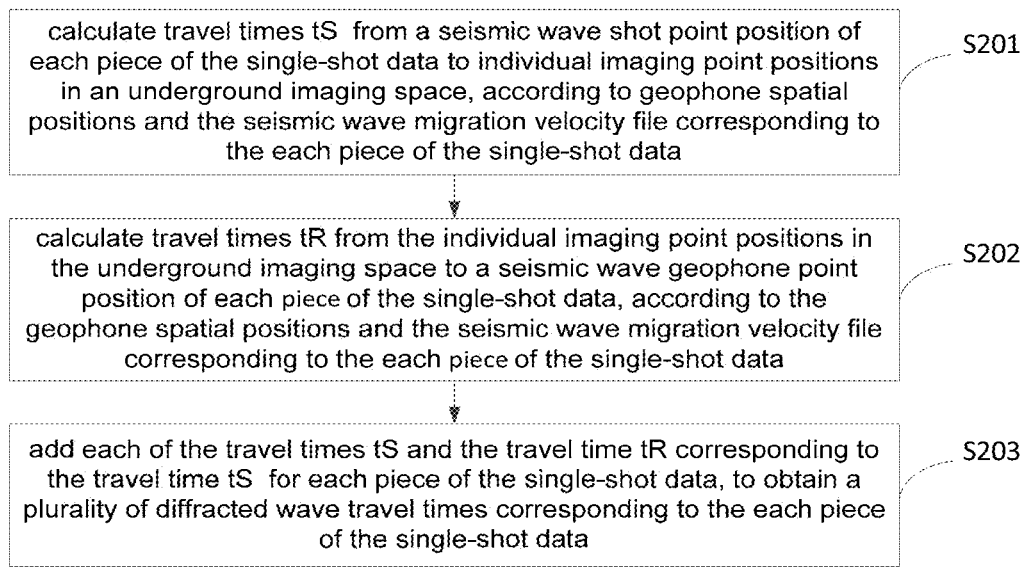
FIG. 2 shows a flow chart of another method for identifying a collapsed coal column provided by embodiments of the present disclosure.

Specifically, since the acquired seismic shot gather data of the target area includes a plurality of pieces of single-shot data, in the embodiment of the present disclosure, the diffracted wave travel times corresponding to each piece of the single-shot data are calculated. The underground imaging space corresponding to each piece of the single-shot data includes a plurality of imaging points, and therefore there are also a plurality of diffracted wave travel times corresponding to the each piece of the single-shot data. Referring to FIG. 2, the specific method for calculating the plurality of diffracted wave travel times corresponding to each piece of the single-shot data includes steps as follows.

In S201, travel times $t_S$ from a seismic wave shot point position of each piece of the single-shot data to individual imaging point positions in the underground imaging space are calculated, according to the geophone spatial positions and the seismic wave migration velocity file corresponding to the each piece of the single-shot data.

Specifically, since there are a plurality of imaging points in the underground imaging space corresponding to each piece of the single-shot data, there are a plurality of corresponding imaging point positions in the underground imaging space. Therefore, a plurality of travel times $t_S$ from the seismic wave shot point position of this single-shot data to the individual imaging point positions in the underground imaging space are calculated, that is, different imaging point positions in the underground imaging space correspond to different travel times $t_S$.

In S202, travel times $t_R$ from the individual imaging point positions in the underground imaging space to the seismic wave geophone point position of the each piece of the single-shot data are calculated, according to the geophone spatial positions and the seismic migration velocity file corresponding to the each piece of the single-shot data, where the travel time $t_R$ and the travel time $t_S$ of each piece of the single-shot data at one imaging point correspond to each other.

Likewise, since there are a plurality of imaging points in the underground imaging space corresponding to each piece of the single-shot data, there are a plurality of corresponding imaging point positions in the underground imaging space. Therefore, there are accordingly a plurality of travel times $t_R$ from the individual imaging point positions in the underground imaging space to the seismic wave geophone point position of each piece of the single-shot data, i.e. different imaging point positions in the underground imaging space correspond to different travel times $t_R$.

It should be indicated that the travel time $t_R$ and the travel time $t_S$ of each piece of the single-shot data at one imaging point corresponding to each other.

In S203, each of the travel times $t_S$ and the travel time $t_R$ corresponding to the travel time $t_S$ for each piece of the single-shot data are added, to obtain a plurality of diffracted wave travel times corresponding to the each piece of the single-shot data.

Figure 3:
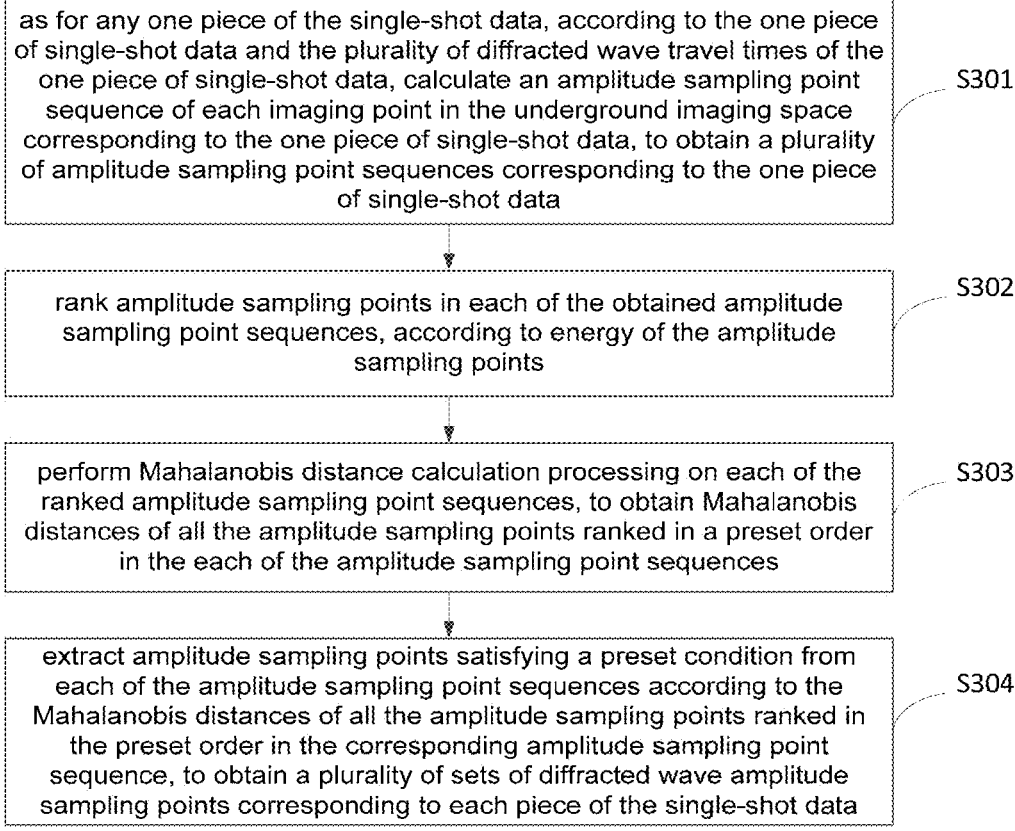
FIG. 3 shows a flow chart of another method for identifying a collapsed coal column provided by embodiments of the present disclosure.

Referring to FIG. 3, in the embodiment of the present disclosure, the performing Mahalanobis distance calculation processing on each piece of the single-shot data and the diffracted wave travel time of the each piece of the single-shot data to obtain diffracted wave amplitude sampling points of the each piece of the single-shot data in Step 103 described above specifically includes steps as follows.

In S301, as for any one piece of of the single-shot data, according to the one piece of single-shot data and the plurality of diffracted wave travel times of the one piece of single-shot data, a amplitude sampling point sequence of each imaging point in the underground imaging space corresponding to the one piece of single-shot data is calculated, to obtain a plurality of amplitude sampling point sequences corresponding to the one piece of single-shot data.

Specifically, each piece of the single-shot data corresponds to different imaging points in the underground imaging space and thus has different diffracted wave travel times. For any one piece of the single-shot data, one amplitude sampling point sequence of this single-shot data at one imaging point may be calculated according to this single-shot data and one diffracted wave travel time of this single-shot data at this imaging point; and for each imaging point corresponding to this single-shot data, a corresponding amplitude sampling point sequence may be calculated. As one piece of the single-shot data corresponds to a plurality of imaging points, a plurality of amplitude sampling point sequences corresponding to the one piece of single-shot data may be calculated.

In S302, amplitude sampling points in each of the obtained amplitude sampling point sequences are ranked, according to energy of the amplitude sampling points.

For each piece of the single-shot data, it includes a plurality of amplitude sampling point sequences, and each of the amplitude sampling point sequences includes a plurality of amplitude sampling points. Since individual amplitude sampling points correspond to different energy, amplitude sampling points in each of the obtained amplitude sampling point sequences may be ranked according to the energy of the amplitude sampling point, so that all the amplitude sampling points in each of the amplitude sampling point sequences are ranked in a preset order.

In S303, Mahalanobis distance calculation processing is performed on each of the ranked amplitude sampling point sequences, to obtain Mahalanobis distances of all amplitude sampling points ranked in the preset order in the each of the amplitude sampling point sequences.

Specifically, each piece of the single-shot data includes a plurality of amplitude sampling point sequences; and for each of the amplitude sampling point sequences, the Mahalanobis distances of the individual amplitude sampling points ranked in the preset order in this amplitude sampling point sequence are calculated.

Correspondingly, calculation processing is performed on the plurality of amplitude sampling point sequences included in each piece of the single-shot data according to the above method for calculating Mahalanobis distances, to obtain the Mahalanobis distances of the individual amplitude sampling points ranked in the preset order in each of the amplitude sampling point sequences.

In S304, extracting amplitude sampling points satisfying a preset condition in each of the amplitude sampling point sequences according to the Mahalanobis distances of all the amplitude sampling points ranked in the preset order in the corresponding amplitude sampling point sequence, to obtain a plurality of sets of diffracted wave amplitude sampling points corresponding to each piece of the single-shot data.

Specifically, the Mahalanobis distance of the amplitude sampling point for the diffracted wave and the Mahalanobis distance of the amplitude sampling point for the reflected wave have preset threshold values, respectively, and the preset threshold values are calculated based on a plurality of experiments. Therefore, with a first preset Mahalanobis distance of the amplitude sampling point for the diffracted wave, amplitude sampling points satisfying the first preset Mahalanobis distance in each of the corresponding amplitude sampling point sequences may be extracted, and the extracted amplitude sampling points are taken as diffracted wave amplitude sampling points. Alternatively, with a second preset Mahalanobis distance of the amplitude sampling point for the reflected wave, amplitude sampling points satisfying the second preset Mahalanobis distance in each of the corresponding amplitude sampling point sequences may be removed, and the remaining amplitude sampling points are the amplitude sampling points satisfying the preset condition, and likewise, these remaining amplitude sampling points are extracted as the diffracted wave amplitude sampling points.

Since each piece of the single-shot data corresponds to a plurality of amplitude sampling point sequences, the each piece of the single-shot data corresponds to a plurality of sets of diffracted wave amplitude sampling points. That is, the number of sets of the diffracted wave amplitude sampling points of each piece of the single-shot data is the same as the number of the amplitude sampling point sequences of this single-shot data.

In the embodiment of the present disclosure, the method for calculating the Mahalanobis distance of the amplitude sampling point in Step 303 described above is specifically performed as follows:

calculating a median value for each of the amplitude sampling point sequences ranked in the preset order through a formula $\mu_x = \text{median}\{x_{(1)}^o, x_{(2)}^o, L, x_{(N)}^o\}$, where $\mu_x$ represents the median value of the amplitude sampling point sequence, median represents a median value operation, $x_{(i)}^o, i=1,2,L,N$ represents the amplitude sampling point sequences ranked in the preset order, and N represents the number of the sampling points in the amplitude sampling point sequence;

calculating a square of an median value of absolute value of deviation, for each of the amplitude sampling point sequences ranked in the preset order, through a formula $$\sigma_x^2 = \left(\underset{i=1,2,L,N}{\text{median}}\{|x_{(i)}^o - \mu_x|\}\right)^2,$$

where $\sigma_x^2$ represents the square of the median value of absolute value of deviation; and calculating Mahalanobis distances of all the amplitude sampling points ranked in the preset order in each of the amplitude sampling point sequences, $$d(x_{(i)}^o, \mu_x) = \frac{[x_{(i)}^o - \mu_x]^2}{\sigma_x^2},$$

according to the median value and the square of the median value of absolute value of deviation, where $d(x_{(i)}^o, \mu_x)$ represents the Mahalanobis distance.

Figure 4:
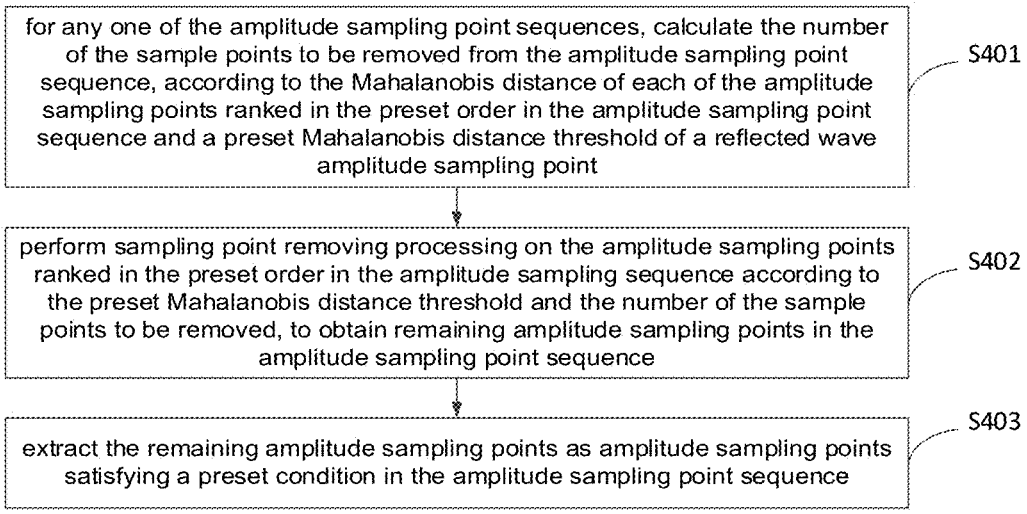
FIG. 4 shows a flow chart of another method for identifying a collapsed coal column provided by embodiments of the present disclosure.

Referring to FIG. 4, the specific method for calculating a plurality of sets of diffracted wave amplitude sampling points for each piece of the single-shot data in Step 304 described above in the embodiment of the present disclosure includes steps as follows.

In S401, as for any one of the amplitude sampling point sequences, the number of the sampling points to be removed from the amplitude sampling point sequence is calculated, according to the Mahalanobis distance of each of the amplitude sampling points ranked in the preset order in the amplitude sampling point sequence and a preset Mahalanobis distance threshold of a reflected wave amplitude sampling point.

Specifically, for any one of the amplitude sampling point sequences, the calculated Mahalanobis distances are compared with the preset Mahalanobis distance threshold of the reflected wave amplitude sampling point (i.e., the second preset Mahalanobis distance described above), and the sampling points with a comparison result satisfying the preset Mahalanobis distance threshold of the reflected wave amplitude sampling point are set as objects to be removed. In this way, the number of the sampling points to be removed from the amplitude sampling point sequence may be calculated.

In S402, sampling point removing processing is performed on the amplitude sampling points ranked in the preset order in the amplitude sampling sequence according to the preset Mahalanobis distance threshold and the number of the sampling points to be removed, to obtain remaining amplitude sampling points in the amplitude sampling point sequence.

Specifically, the diffracted wave amplitude sampling points are extracted from the ranked amplitude sampling point sequence according to the number of the sampling points to be removed. That is, the amplitude sampling points corresponding to a first segment and a last segment of the ranked amplitude sampling point sequence, which do not satisfy the condition, are removed from the sequence, where the number of the sampling points to be removed depends on the above number of the sampling points to be removed.

In S403, the remaining amplitude sampling points are extracted as amplitude sampling points satisfying the preset condition in the amplitude sampling point sequence.

Specifically, all the remaining amplitude sampling points satisfy the first preset Mahalanobis distance of the amplitude sampling point for the diffracted wave. Therefore, these remaining amplitude sampling points are extracted as the amplitude sampling points satisfying the preset condition.

In the embodiment of the present disclosure, the specific method for imaging respectively the diffracted wave amplitude sampling points of each piece of the single-shot data to obtain a diffracted wave imaging result of the each piece of the single-shot data in Step 104 includes:

adding the amplitude sampling points satisfying the preset condition that are extracted from each of the amplitude sampling point sequences, to obtain a diffracted wave imaging result corresponding to the each of the amplitude sampling point sequences; and superposing the diffracted wave imaging results of all the amplitude sampling point sequences corresponding to the single-shot data, to obtain the diffracted wave imaging result corresponding to the single-shot data.

Specifically, since each piece of the single-shot data includes a plurality of amplitude sampling point sequences, the amplitude sampling points satisfying the preset condition (i.e. the diffracted wave amplitude sampling points) are extracted from each of the amplitude sampling point sequences, and then the diffracted wave amplitude sampling points of the each of the amplitude sampling point sequences are added, to obtain the diffracted wave imaging result corresponding to the amplitude sampling point sequence.

Once the diffracted wave imaging results corresponding to all the amplitude sampling point sequences in each piece of the single-shot data are obtained, these diffracted wave imaging results are superposed to obtain the diffracted wave imaging result corresponding to this single-shot data.

For the seismic shot gather data, the diffracted wave imaging results of the individual single-shot data included therein are superposed likewise, to obtain the diffracted wave imaging result of the seismic shot gather data.

Specifically, the calculating the diffracted wave imaging result corresponding to each of the amplitude sampling point sequences described above includes:

adding the amplitude sampling points satisfying the preset condition that are extracted from each of the amplitude sampling point sequences through a formula $$V(m) = \frac{-1}{2\pi} \int \int_A Tri_M\{w(m, r)u(r, t_S + t_R)\}dr,$$

to obtain the diffracted wave imaging result corresponding to the each of the amplitude sampling point sequences, where V(m) represents the diffracted imaging result, m=m (x,y,z) represents each imaging point position in the underground imaging space, $u(r,t_S+t_R)$ represents pre-processed seismic shot gather data, r(x,y,z) represents a geophone point position, $t_S$ and $t_R$ represents the travel time from a shot point position to the imaging point position and the travel time from the imaging point position to the geophone position, respectively, A represents an migration imaging pore diameter, w(m,r) represents a geometric spreading factor, and $Tri_M$ is a diffracted wave imaging operator for the removal based on the Mahalanobis distance and the reflected wave amplitude.

Figure 5:
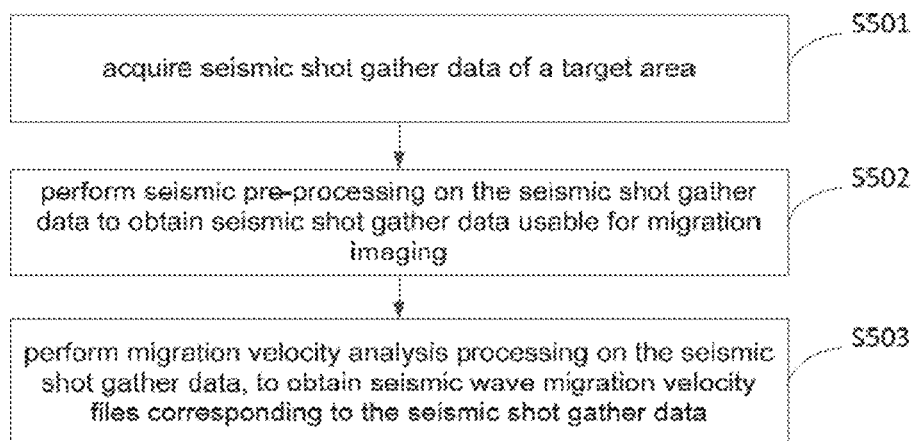
FIG. 5 shows a flow chart of another method for identifying a collapsed coal column provided by embodiments of the present disclosure.

In the embodiment of the present disclosure, in order to ensure that the diffracted wave is better extracted from the acquired seismic shot gather data, the acquired seismic shot gather data need to be further processed. Referring to FIG. 5, such processing specifically includes steps as follows.

In S501, seismic shot gather data of a target area is acquired.

In S502, seismic pre-processing is performed on the seismic shot gather data, to obtain seismic shot gather data usable for migration imaging, where the seismic pre-processing at least includes denoising processing and statics correction processing.

In S503, migration velocity analysis processing is performed on the seismic shot gather data, to obtain seismic wave migration velocity files corresponding to the seismic shot gather data.

In conjunction with the above steps 501 to 503, the shot gather data (i.e., the seismic waves) is received by the geophones, and an observing system is added such that the acquired shot gather data is sent to the observing system. The observing system performs the seismic pre-processing on the seismic shot gather data, that is, the observing system loads the received seismic shot gather data and performs denoising, velocity analysis and migration on the loaded seismic waves, to obtain the seismic shot gather data and the seismic wave migration velocity files corresponding to the seismic shot gather data.

Below the method for identifying a collapsed coal column provided by the embodiment of the present disclosure is illustrated in conjunction with a specific example.

Application effects of a collapsed coal column evaluating technique and apparatus based on seismic diffracted wave imaging in evaluating the collapsed coal column are illustrated with coal three-dimensional seismic data.

(1) Seismic shot gather data and migration velocity files are read in;

(2) A seismic wave travel time table is calculated according to an input migration velocity model.

(3) A diffracted wave imaging result is obtained according to the travel time table and the seismic shot gather data.

Figure 6:
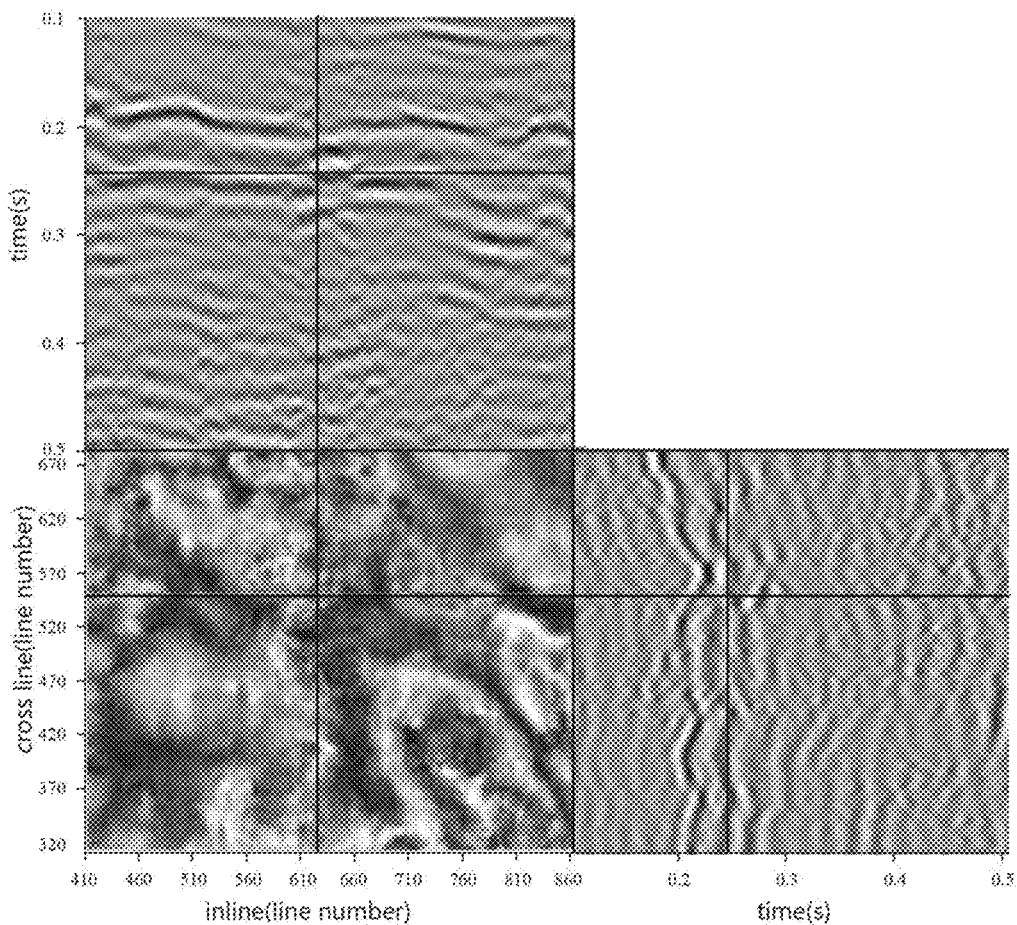
FIG. 6 shows a schematic diagram illustrating an imaging result of conventional reflected waves provided by embodiments of the present disclosure.
Figure 7:
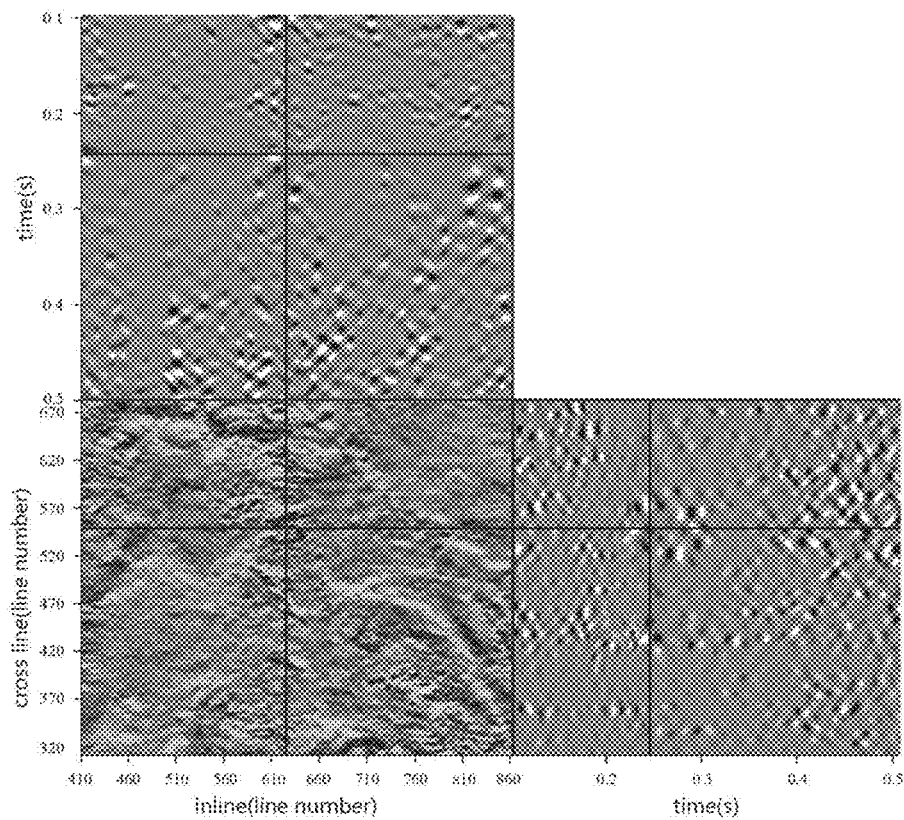
FIG. 7 shows a schematic diagram illustrating an imaging result of diffracted waves obtained by using a method for identifying a collapsed coal column provided by embodiments of the present disclosure, where a sectional view and slice plots of a corresponding position are included.

(4) In order to compare the application effects of the diffracted wave imaging result with the conventional reflected wave imaging result in terms of evaluating the collapsed column, comparison figures for the two are provided in the present embodiment. FIG. 6 shows the conventional reflected wave imaging result, including a section in an inline direction and a cross line direction as well as slice plots at 0.24 second. FIG. 7 shows the diffracted wave imaging result, including a section and slice plots of a corresponding position.

As shown in FIG. 6 and FIG. 7, the diffracted wave imaging result well shows the morphology of a verified collapsed column at an intersection position of the inline and the cross line of the slice, whereas this collapsed column does not appear on the reflected wave imaging slice.

Compared with the seismic wave imaging technique developed for reflected waves in the prior art which has poor performance in identifying collapsed columns, in the method and apparatus for identifying a collapsed coal column provided by the embodiments of the present disclosure, the diffracted wave travel times corresponding to each piece of the single-shot data in the seismic shot gather data are firstly calculated; Mahalanobis distance calculation processing is performed on the single-shot data and the diffracted wave travel times of the single-shot data, so as to obtain the diffracted waves corresponding to all the single-shot data; and then the diffracted waves are imaged. Since the diffracted waves carry small-scale geological information, the geological body of the collapsed column can be accurately evaluated with the imaged diffracted waves, that is, the collapsed coal column in a target area can be accurately identified. Therefore, the risk of accidents, such as water burst and gas leakage, caused by the collapsed column can be reduced during coal exploitation, and unnecessary casualty and economic loss are accordingly decreased.

Figure 8:
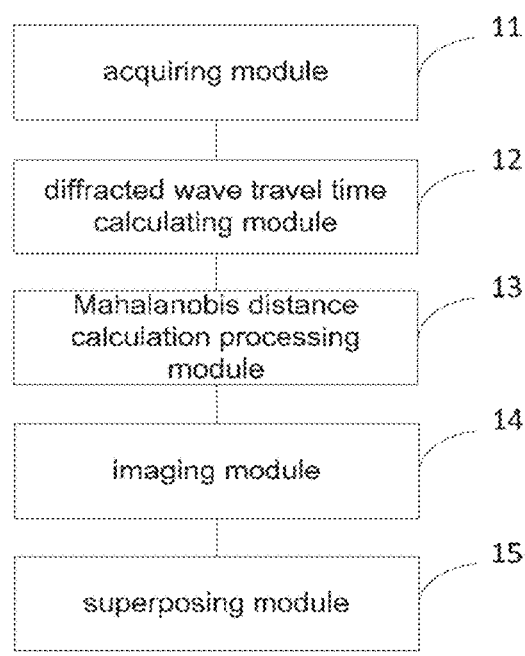
FIG. 8 shows structural schematic diagram of an apparatus for identifying a collapsed coal column provided by embodiments of the present disclosure.

An embodiment of the present disclosure further provides an apparatus for identifying a collapsed coal column. Referring to FIG. 8, the apparatus includes:

an acquiring module 11, configured to acquire seismic shot gather data of a target area and seismic wave migration velocity files corresponding to the seismic shot gather data, where the seismic shot gather data includes a plurality of pieces of single-shot data, each piece of the single-shot data includes a plurality of seismic waves reflected or refracted by underground rock interfaces, and the seismic waves carry geological information;

a diffracted wave travel time calculating module 12, configured to calculate, according to geophone spatial positions and the seismic wave migration velocity file corresponding to the each piece of the single-shot data, diffracted wave travel times for each piece of the single-shot data from a seismic wave shot point position of the each piece of the single-shot data through any imaging point position in an underground imaging space to a seismic wave geophone point position of the each piece of the single-shot data;

a Mahalanobis distance calculation processing module 13, configured to perform Mahalanobis distance calculation processing on each piece of the single-shot data and the diffracted wave travel time of the each piece of the single-shot data, to acquire diffracted wave amplitude sampling points of the each piece of the single-shot data, where the diffracted wave amplitude sampling points carry small-scale geological information, with the small-scale geological information at least including stratigraphic position information, fault information and collapsed column information;

an imaging module 14, configured to image respectively the diffracted wave amplitude sampling points of each piece of the single-shot data, to obtain a diffracted wave imaging result of the each piece of the single-shot data; and a superposing module 15, configured to superpose the diffracted wave imaging results of all the single-shot data corresponding to the seismic shot gather data, to obtain a diffracted wave imaging result of the seismic shot gather data, so as to identify the collapsed coal column according to the diffracted wave imaging result of the seismic shot gather data.

Figure 9:
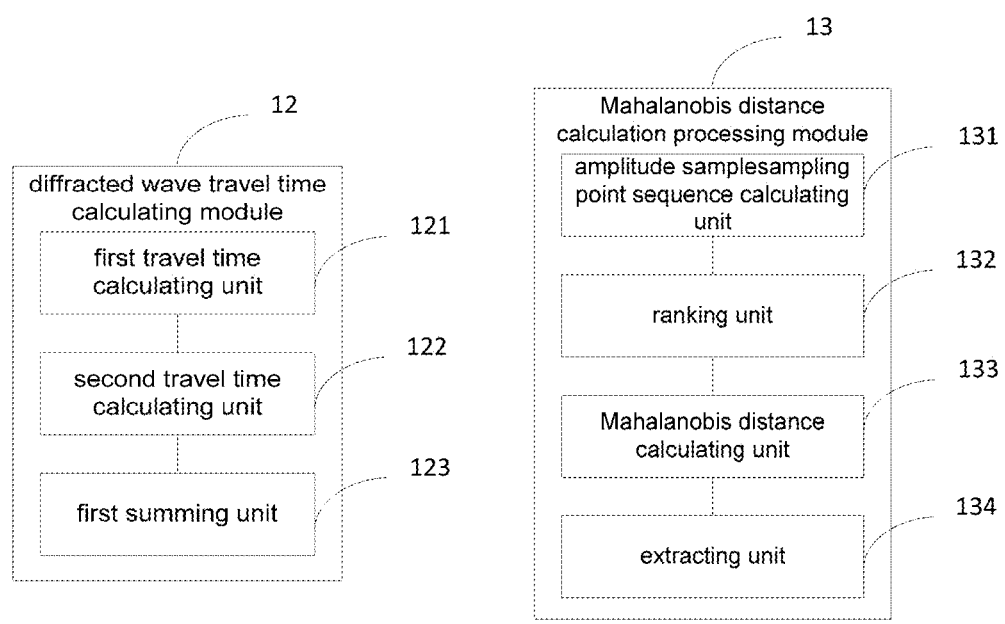
FIG. 9 shows structural schematic diagrams of a diffracted wave travel time calculating module and a Mahalanobis distance calculation processing module in the apparatus for identifying the collapsed coal column provided by embodiments of the present disclosure.

Further, referring to FIG. 9, in the apparatus for identifying the collapsed coal column based on seismic diffracted wave imaging, the diffracted wave travel time calculating module 12 includes:

a first travel time calculating unit 121, configured to calculate, according to geophone spatial positions and the seismic wave migration velocity file corresponding to each piece of the single-shot data, travel times $t_S$ from the seismic wave shot point position of the each piece of the single-shot data to individual imaging point positions in the underground imaging space;

a second travel time calculating unit 122, configured to calculate, according to the geophone spatial positions and the seismic wave migration velocity file corresponding to each piece of the single-shot data, travel times $t_R$ from the individual imaging point positions in the underground imaging space to the seismic wave geophone point position of the each piece of the single-shot data, where the travel time $t_R$ and the travel time $t_S$ of each piece of the single-shot data at one imaging point correspond to each other; and a first summing unit 123, configured to add each of the travel times $t_S$ and the travel time $t_R$ corresponding to the travel time $t_S$ for each piece of the single-shot data, to obtain a plurality of diffracted wave travel times corresponding to the each piece of the single-shot data.

Further, referring to FIG. 9, in the apparatus for identifying the collapsed coal column based on seismic diffracted wave imaging, the Mahalanobis distance calculation processing module 13 includes:

an amplitude sampling point sequence calculating unit 131, configured to, calculate, as for any one piece of the single-shot data, according to the one piece of single-shot data and the plurality of diffracted wave travel times of the one piece of single-shot data, an amplitude sampling point sequence of each imaging point in the underground imaging space corresponding to the one piece of single-shot data, to obtain a plurality of amplitude sampling point sequences corresponding to the one piece of single-shot data;

a ranking unit 132, configured to rank amplitude sampling points in each of the obtained amplitude sampling point sequences, according to energy of the amplitude sampling points;

a Mahalanobis distance calculating unit 133, configured to perform Mahalanobis distance calculation processing on each of the ranked amplitude sampling point sequences, to obtain Mahalanobis distances of all the amplitude sampling points ranked in a preset order in the each of the amplitude sampling point sequences; and an extracting unit 134, configured to extract amplitude sampling points satisfying a preset condition from each of the amplitude sampling point sequences according to the Mahalanobis distances of all the amplitude sampling points ranked in the preset order in the corresponding amplitude sampling point sequence, to obtain a plurality of sets of diffracted wave amplitude sampling points corresponding to each piece of the single-shot data.

Further, in the apparatus for identifying the collapsed coal column based on seismic diffracted wave imaging, the Mahalanobis distance calculating unit 133 includes:

a first calculating sub-unit, configured to calculate a median value for each of the amplitude sampling point sequences ranked in the preset order through a formula $\mu_x = \text{median}\{x_{(1)}^o, x_{(2)}^o, L, x_{(N)}^o\}$, where $\mu_x$ represents a median value of the amplitude sampling point sequence, median represents a median value operation, $x_{(i)}^o, i=1,2,L,N$ represents the amplitude sampling point sequences ranked in the preset order, and N represents the number of the sampling points in the amplitude sampling point sequence;

a second calculating sub-unit, configured to calculate a square of an median value of absolute value of deviation, for each of the amplitude sampling point sequences ranked in the preset order, through a formula $$\sigma_x^2 = \left(\underset{i=1,2,L,N}{\text{median}}\{|x_{(i)}^o - \mu_x|\}\right)^2,$$

where $\sigma_x^2$ is the square of the median value of absolute value of deviation; and a third calculating sub-unit, configured to calculate Mahalanobis distances of all the amplitude sampling points ranked in the preset order in each of the amplitude value sample point sequences, $$d(x_{(i)}^o, \mu_x) = \frac{[x_{(i)}^o - \mu_x]^2}{\sigma_x^2},$$

according to the median value and the square of the median value of absolute value of deviation, where $d(x_{(i)}{}^o, \mu_x)$ is the Mahalanobis distance.

Furthermore, in the apparatus for identifying the collapsed coal column based on seismic diffracted wave imaging, the extracting unit 134 includes:

a fourth calculating sub-unit, configured to calculate, as for any of the amplitude sampling point sequences, the number of the sample points to be removed from the amplitude sampling point sequence, according to the Mahalanobis distance of each of the amplitude sampling points ranked in the preset order in the amplitude sampling point sequence and a preset Mahalanobis distance threshold of a reflected wave amplitude sampling point;

a sampling point removing processing sub-unit, configured to perform sampling point removing processing on the amplitude sampling points ranked in the preset order in the amplitude sampling sequence according to the preset Mahalanobis distance threshold and the number of the sampling points to be removed, to obtain remaining amplitude sampling points in the amplitude sampling point sequence; and an extracting sub-unit, configured to extract the remaining amplitude sampling points as the amplitude sampling points satisfying the preset condition in the amplitude sampling point sequence.

Furthermore, in the apparatus for identifying the collapsed coal column based on seismic diffracted wave imaging, the imaging module 14 includes:

a second summing unit, configured to add the amplitude value sampling points satisfying the preset condition that are extracted from each of the amplitude sampling point sequences, to obtain a diffracted wave imaging result corresponding to the each of the amplitude sampling point sequences; and a superposing unit, configured to superpose the diffracted wave imaging results of all the amplitude sampling point sequences corresponding to the single-shot data, to obtain the diffracted wave imaging result corresponding to the single-shot data.

Furthermore, in the apparatus for identifying the collapsed coal column based on seismic diffracted wave imaging, the second summing unit is further configured to image the diffracted waves of each piece of the single-shot data through a formula $$V(m) = \frac{-1}{2\pi} \int \int_A Tri_M\{w(m, r)u(r, t_S + t_R)\}dr,$$

where V(m) represents the diffracted wave imaging result, m=m(x,y,z) represents each imaging point position in the underground imaging space, $u(r,t_S+t_R)$ represents pre-processed seismic shot gather data, r(x,y,z) represents a geophone point position, $t_S$ and $t_R$ represent the travel time from a shot point position to the imaging point position and the travel time from the imaging point position to the geophone position, respectively, A represents a migration imaging pore diameter, w(m,r) represents a geometric spreading factor, and $Tri_M$ represents a diffracted wave imaging operator for the removal based on the Mahalanobis distance and a reflected wave amplitude.

Furthermore, in the apparatus for identifying the collapsed coal column based on seismic diffracted wave imaging, the acquiring module 11 includes:

an acquiring unit, configured to acquire the seismic shot gather data of the target area;

a seismic pre-processing unit, configured to perform seismic pre-processing on the seismic shot gather data to obtain seismic shot gather data usable for migration imaging, where the seismic pre-processing at least includes denoising processing and statics correction processing; and an migration velocity analysis processing unit, configured to perform migration velocity analysis processing on the seismic shot gather data, to obtain seismic wave migration velocity files corresponding to the seismic shot gather data.

Compared with the seismic wave imaging technique developed for reflected waves in the prior art which has poor performance in identifying collapsed columns, in the apparatus for identifying a collapsed coal column provided by the embodiment of the present disclosure, the diffracted wave travel times corresponding to each piece of the single-shot data in the seismic shot gather data are firstly calculated; Mahalanobis distance calculation processing is performed on the single-shot data and the diffracted wave travel times of the single-shot data, so as to obtain the diffracted waves corresponding to all the single-shot data; and then the diffracted waves are imaged. Since the diffracted waves carry smaller-scale geological information, the geological body of the collapsed column can be accurately evaluated with the imaged diffracted waves, that is, the collapsed coal column in a target area can be accurately identified. Therefore, the risk of accidents, such as water burst and gas leakage, caused by the collapsed column can be reduced during coal exploitation, and unnecessary casualty and economic loss are accordingly decreased.

In the several embodiments provided by the present application, it should be understood that the disclosed system, apparatus and method can be realized in other manners. The apparatus embodiments described above are merely illustrative. For example, the units are merely divided based on their logic functions, and other dividing modes may also be used in practical implementation. For another embodiment, a plurality of units or components may be combined or integrated into another system, or some features may be omitted or not implemented. In addition, the mutual coupling or direct coupling or communication connection as shown or discussed may be indirect coupling or communication connection via some communication interfaces, apparatus or units, and they may be electrical, mechanical or in other forms.

The units explained as separate parts may be physically separated or not. The parts shown as units may be physical units or not, that is, they may be located at one place, or they may also be distributed onto a plurality of network units. Part or all of the units may be chosen according to practical requirements to realize the object of the solution of the present embodiment.

In addition, various functional units in the individual embodiments of the present disclosure may be integrated into one processing unit, or the various units may also be physically independent, or two or more units may be integrated into one unit.

If the functions are realized in the form of a software functional unit and are sold or used as a stand-alone product, they may be stored in a computer readable storage medium. Based on such understanding, the technical solution of the present disclosure may have a part thereof, that is essential or contributes to the prior art, or parts of this technical solution embodied in the form of a software product. Such computer software product is stored in a storage medium, including several commands used to cause a computer device (which may be a personal computer, a sever, or a network device etc.) to execute all or part of the steps of the methods described in various embodiments of the present disclosure. The aforementioned storage medium includes various media capable of storing program codes, such as a U disk, a mobile hard disk, a Read-Only Memory (ROM), a Random Access Memory (RAM), a diskette or a compact disk.

The foregoing are merely specific implementations of the present disclosure, and the scope of protection of the present disclosure is not limited thereto. Any variations or substitutions, that would readily occur to any skilled person familiar with the present technical field, should fall into the scope of protection of the present disclosure. Therefore, the protection scope of the present disclosure should to be determined by the scope of protection of the claims.

The invention claimed is:

1. A method for identifying a collapsed coal column, comprising:
   acquiring seismic shot gather data of a target area and seismic wave migration velocity data corresponding to the seismic shot gather data, wherein the seismic shot gather data comprises a plurality of single-shot data, each single-shot data comprises a plurality of seismic waves reflected or refracted by underground rock interfaces, and the seismic waves carry geological information;
   calculating diffracted wave travel times for each single-shot data from a seismic wave shot point position of the each single-shot data through any imaging point position in an underground imaging space to a seismic wave geophone point position of the each single-shot data, according to geophone spatial positions and the seismic wave migration velocity data corresponding to the each single-shot data;
   performing Mahalanobis distance calculation processing on each single-shot data and the diffracted wave travel time of the each single-shot data, to obtain diffracted wave amplitude sampling points of the each single-shot data, wherein the diffracted wave amplitude sampling points carry small-scale geological information, with the small-scale geological information at least comprising stratigraphic position information, fault information and collapsed column information;
   imaging respectively the diffracted wave amplitude sampling points of each single-shot data, to obtain a diffracted wave imaging result of the each single-shot data; and
   superposing the diffracted wave imaging results of all the single-shot data corresponding to the seismic shot gather data, to obtain a diffracted wave imaging result of the seismic shot gather data, so as to identify the collapsed coal column according to the diffracted wave imaging result of the seismic shot gather data, wherein the diffracted wave imaging result of the seismic shot gather data shows morphology of the collapsed column at an intersection position of an inline and a cross line of a slice, to determine damage situation of continuity of a coal seam;
   wherein the step of calculating diffracted wave travel times for each single-shot data from a seismic wave shot point position of the each single-shot data through any imaging point position in an underground imaging space to a seismic wave geophone point position of the each single-shot data according to geophone spatial positions and the seismic wave migration velocity data corresponding to the each single-shot data comprises:
   calculating travel times $t_S$ from a seismic wave shot point position of each single-shot data to individual imaging point positions in an underground imaging space, according to geophone spatial positions and the seismic wave migration velocity data corresponding to the each single-shot data;
   calculating travel times $t_R$ from the individual imaging point positions in the underground imaging space to a seismic wave geophone point position of each single-shot data, according to the geophone spatial positions and the seismic wave migration velocity data corresponding to the each single-shot data, wherein the travel time $t_R$ and the travel time $t_S$ of each single-shot data at one imaging point correspond to each other; and
   adding each of the travel times $t_S$ and the travel time $t_R$ corresponding to the travel time $t_S$ for each single-shot data, to obtain a plurality of diffracted wave travel times corresponding to each single-shot data;
   wherein the step of performing Mahalanobis distance calculation processing on each single-shot data and the diffracted wave travel time of the each single-shot data to obtain diffracted wave amplitude sampling points of the each single-shot data comprises:
   calculating, as for any one of the single-shot data, according to the one of single-shot data and the plurality of diffracted wave travel times of the one of single-shot data, an amplitude sampling point sequence of each imaging point in the underground imaging space corresponding to the one of single-shot data, to obtain a plurality of amplitude sampling point sequences corresponding to the one of single-shot data;
   ranking amplitude sampling points in each of the obtained amplitude sampling point sequences, according to energy of the amplitude sampling points;
   performing Mahalanobis distance calculation processing on each of the ranked amplitude sampling point sequences, to obtain Mahalanobis distances of all the amplitude sampling points ranked in a preset order in the each of the amplitude sampling point sequences; and
   extracting amplitude sampling points satisfying a preset condition from each of the amplitude sampling point sequences according to the Mahalanobis distances of all the amplitude sampling points ranked in the preset order in the corresponding amplitude sampling point sequence, to obtain a plurality of sets of diffracted wave amplitude sampling points corresponding to each single-shot data;
   wherein the step of imaging respectively the diffracted wave amplitude sampling points of each single-shot data to obtain a diffracted wave imaging result of the each single-shot data comprises:
   adding the amplitude value sampling points satisfying the preset condition that are extracted from each of the amplitude sampling point sequences, to obtain a diffracted wave imaging result corresponding to the each of the amplitude sampling point sequences; and
   superposing the diffracted wave imaging results of all the amplitude sampling point sequences corresponding to the single-shot data, to obtain a diffracted wave imaging result corresponding to the single-shot data; and wherein the step of adding the amplitude value sampling points satisfying the preset condition that are extracted from each of the amplitude sampling point sequences to obtain a diffracted wave imaging result corresponding to the each of the amplitude sampling point sequences comprises:

adding the amplitude sampling points satisfying the preset condition that are extracted from each of the amplitude sampling point sequences through a formula $$V(m) = \frac{-1}{2\pi} \int \int_A Tri_M\{w(m, r)u(r, t_S + t_R)\}dr,$$

to obtain a diffracted wave imaging result corresponding to the each of the amplitude sampling point sequences, wherein V(m) represents the diffracted wave imaging result, m represents each imaging point position in the underground imaging space, $u(r,t_S+t_R)$ represents pre-processed seismic shot gather data, r represents a geophone point position, $t_S$ and $t_R$ represent the travel time from a shot point position to the imaging point position and the travel time from the imaging point positon to the geophone position, respectively, A represents a migration imaging pore diameter, w(m,r) represents a geometric spreading factor, and $Tri_M$ represents a diffracted wave imaging operator for the removal based on the Mahalanobis distance and a reflected wave amplitude.

2. The method according to claim 1, wherein the step of performing Mahalanobis distance calculation processing on each of the ranked amplitude sampling point sequences to obtain Mahalanobis distances of all the amplitude sampling points ranked in a preset order in the each of the amplitude sampling point sequences comprises:

calculating a median value for each of the amplitude sampling point sequences ranked in a preset order through a formula $\mu_x$=median$\{x_{(1)}^o,x_{(2)}^o,L,x_{(N)}^o\}$ wherein $\mu_x$ represents a median value of the amplitude sampling point sequence, median represents a median value operation, $x_{(i)}^o$,i=1,2,L ,N represents the amplitude sampling point sequences ranked in the preset order, and N represents the number of the sampling points in the amplitude sampling point sequence;

calculating a square of a median value of absolute value of deviation, for each of the amplitude sampling point sequences ranked in the preset order, through a formula $$\sigma_x^2 = \left(\underset{i=1,2,L,N}{median}\{|x_{(i)}^o - \mu_x|\}\right)^2,$$

wherein $\sigma_x^2$ represents the square of the median value of absolute value of deviation; and calculating Mahalanobis distances of all the amplitude sampling points ranked in the preset order in each of the amplitude value sample point sequences, $$d(x_{(i)}^o, \mu_x) = \frac{[x_{(i)}^o - \mu_x]^2}{\sigma_x^2},$$

according to the median value and the square of the median value of absolute value of deviation, wherein $d(x_{(i)}^o, \mu_x)$ represents the Mahalanobis distance.

3. The method according to claim 2, wherein the step of extracting amplitude sampling points satisfying a preset condition from each of the amplitude sampling point sequences according to the Mahalanobis distances of all the amplitude sampling points ranked in the preset order in the corresponding amplitude sampling point sequence comprises:

calculating, as for any one of the amplitude sampling point sequences, the number of the sample points to be removed from the amplitude sampling point sequence, according to the Mahalanobis distance of each of the amplitude sampling points ranked in the preset order in the amplitude sampling point sequence and a preset Mahalanobis distance threshold of a reflected wave amplitude sampling point;

performing sampling point removing processing on the amplitude sampling points ranked in the preset order in the amplitude sampling sequence, according to the preset Mahalanobis distance threshold and the number of the sample points to be removed, to obtain remaining amplitude sampling points in the amplitude sampling point sequence; and extracting the remaining amplitude sampling points as amplitude sampling points satisfying a preset condition in the amplitude sampling point sequence.

4. The method according to claim 1, wherein the step of acquiring seismic shot gather data of a target area and seismic wave migration velocity data corresponding to the seismic shot gather data comprises:

acquiring seismic shot gather data of a target area;

performing seismic pre-processing on the seismic shot gather data to obtain seismic shot gather data usable for migration imaging, wherein the seismic pre-processing at least comprises denoising processing and statics correction processing; and performing migration velocity analysis processing on the seismic shot gather data, to obtain seismic wave migration velocity data corresponding to the seismic shot gather data.

* * * * *